United States Patent
Wortmann et al.

(10) Patent No.: US 11,209,189 B2
(45) Date of Patent: Dec. 28, 2021

(54) METHOD FOR OPERATING A LINEAR CONCENTRATOR SOLAR POWER PLANT, AND LINEAR CONCENTRATOR SOLAR POWER PLANT

(71) Applicant: BASF SE, Ludwigshafen (DE)

(72) Inventors: Jürgen Wortmann, Limburgerhof (DE); Michael Lutz, Speyer (DE); Katharina Federsel, Heidelberg (DE); Kerstin Schierle-Arndt, Zwingenberg (DE); Stephan Maurer, Neustadt (DE); Michael Ladenberger, Darstein (DE); Markus Ostermayr, Bad Dürkheim (DE)

(73) Assignee: BASF SE, Ludwigshafen am Rhein (DE)

( * ) Notice: Subject to any disclaimer, the term of this patent is extended or adjusted under 35 U.S.C. 154(b) by 312 days.

(21) Appl. No.: 15/116,246

(22) PCT Filed: Feb. 5, 2015

(86) PCT No.: PCT/EP2015/052382
§ 371 (c)(1),
(2) Date: Aug. 3, 2016

(87) PCT Pub. No.: WO2015/118052
PCT Pub. Date: Aug. 13, 2015

(65) Prior Publication Data
US 2017/0010024 A1    Jan. 12, 2017

(30) Foreign Application Priority Data

Feb. 6, 2014   (EP) .................................... 14154178

(51) Int. Cl.
*F24S 20/20*    (2018.01)
*F24S 10/30*    (2018.01)
(Continued)

(52) U.S. Cl.
CPC .............. *F24S 20/20* (2018.05); *F03G 6/067* (2013.01); *F24S 10/30* (2018.05); *F24S 40/00* (2018.05);
(Continued)

(58) Field of Classification Search
CPC .. F24S 20/00; F24S 20/20; F24S 20/40; F24S 20/60; F24S 10/30; F24S 40/00;
(Continued)

(56) References Cited

U.S. PATENT DOCUMENTS 4,233,127 A * 11/1980 Monahan ............... B01J 19/127
                                                         204/157.5
4,299,200 A * 11/1981 Spencer .................. F24S 10/55
                                                         126/584
(Continued)

FOREIGN PATENT DOCUMENTS

CN   101354191 A      1/2009
CN   102812306 A *   12/2012 .............. F24S 20/20
(Continued)

OTHER PUBLICATIONS

International Search Report for PCT/EP2015/052382 dated Apr. 16, 2015.
(Continued)

*Primary Examiner* — Avinash A Savani
*Assistant Examiner* — Martha M Becton
(74) *Attorney, Agent, or Firm* — Faegre Drinker Biddle & Reath LLP (57) ABSTRACT

The invention relates to a method for operating a linearly concentrating solar power plant (1), in which a heat transfer medium flows through a pipeline loop (47) having at least one receiver, the heat transfer medium having a flow velocity which is such that the flow in the pipeline loop (47) is turbulent, at least part of the heat transfer medium, upon exit (Continued)

from the pipeline loop (47), being extracted and recirculated into the pipeline loop (47). Furthermore, the invention relates to a linearly concentrating solar power plant with at least one pipeline loop (47) having at least one receiver in which a heat transfer medium flowing through the pipeline loop (47) is heated by irradiating solar energy, a mixing device (27) being comprised, in which at least part of the heat transfer medium flowing through the pipeline loop (47) is mixed with heat transfer medium to be delivered.

11 Claims, 4 Drawing Sheets

(51) Int. Cl.
| | |
|---|---|
| *F24S 60/30* | (2018.01) |
| *F24S 40/00* | (2018.01) |
| *F03G 6/06* | (2006.01) |
| *F24S 90/00* | (2018.01) |
| *F24S 40/60* | (2018.01) |
| *F24S 80/20* | (2018.01) |

(52) U.S. Cl.
CPC .............. *F24S 40/60* (2018.05); *F24S 60/30* (2018.05); *F24S 80/20* (2018.05); *F24S 90/00* (2018.05); *Y02E 10/40* (2013.01); *Y02E 10/46* (2013.01)

(58) Field of Classification Search
CPC .. F24S 40/60; F24S 60/30; F24S 80/20; F24S 90/00; F03G 6/067; Y02E 10/41; Y02E 10/46
See application file for complete search history.

(56) References Cited

U.S. PATENT DOCUMENTS

| | | | |
|---|---|---|---|
| 4,432,343 A | 2/1984 | Riise et al. | |
| H2231 H * | 8/2009 | Teoh | F24S 90/10 |
| | | | 126/639 |
| 8,739,774 B2 * | 6/2014 | O'Donnell | F24S 10/742 |
| | | | 126/600 |
| 8,752,542 B2 * | 6/2014 | O'Donnell | F24S 10/742 |
| | | | 126/600 |
| 9,086,058 B2 * | 7/2015 | Olavarria Rodriguez-Arango | F03G 6/003 |
| 9,394,780 B2 * | 7/2016 | Bruce | F28D 20/0052 |
| 10,082,316 B2 * | 9/2018 | O'Donnell | F24S 40/80 |
| 2002/0185124 A1 * | 12/2002 | Blackmon, Jr. | F24S 23/30 |
| | | | 126/680 |
| 2005/0126170 A1 * | 6/2005 | Litwin | F03G 6/065 |
| | | | 60/641.8 |
| 2009/0165780 A1 * | 7/2009 | Ota | F03G 6/00 |
| | | | 126/634 |
| 2010/0078011 A1 | 4/2010 | Feher | |
| 2010/0199974 A1 * | 8/2010 | Plotkin | F24S 20/20 |
| | | | 126/617 |
| 2011/0126824 A1 * | 6/2011 | Conlon | F22B 1/006 |
| | | | 126/601 |
| 2012/0132403 A1 * | 5/2012 | Olavarria Rodriguez-Arango | F03G 6/003 |
| | | | 165/104.25 |
| 2013/0056081 A1 * | 3/2013 | Wortmann | F17D 3/00 |
| | | | 137/2 |
| 2013/0086904 A1 * | 4/2013 | Bent | F01K 13/00 |
| | | | 60/641.8 |
| 2013/0092153 A1 * | 4/2013 | O'Donnell | F24S 10/742 |
| | | | 126/600 |
| 2013/0199517 A1 * | 8/2013 | Navio Gilaberte | F24S 60/10 |
| | | | 126/646 |
| 2013/0223826 A1 * | 8/2013 | Bruce | B01D 17/042 |
| | | | 392/471 |
| 2013/0247900 A1 * | 9/2013 | O'Donnell | F24S 10/742 |
| | | | 126/634 |
| 2014/0326234 A1 * | 11/2014 | O'Donnell | F24S 10/742 |
| | | | 126/634 |
| 2015/0167647 A1 * | 6/2015 | Gulen | F03G 6/06 |
| | | | 60/641.11 |
| 2017/0010024 A1 * | 1/2017 | Wortmann | F24S 80/20 |
| 2018/0023421 A1 * | 1/2018 | Wortmann | F03G 6/067 |
| | | | 60/659 |
| 2019/0056147 A1 * | 2/2019 | Brisebois | G06F 1/20 |

FOREIGN PATENT DOCUMENTS

| | | |
|---|---|---|
| DE | 19953493 A1 | 5/2001 |
| DE | 10152968 C1 | 4/2003 |
| EP | 2 653 801 A1 | 10/2013 |
| WO | WO-2010/138606 A2 | 12/2010 |
| WO | WO-2013/034587 A1 | 3/2013 |

OTHER PUBLICATIONS

International Preliminary Report on Patentability and English Translation thereof Issued in PCT/EP2015/052382 dated Apr. 22, 2016.

* cited by examiner

METHOD FOR OPERATING A LINEAR CONCENTRATOR SOLAR POWER PLANT, AND LINEAR CONCENTRATOR SOLAR POWER PLANT

RELATED APPLICATIONS

This application is a national stage application (under 35 U.S.C. § 371) of PCT/EP2015/052382, filed Feb. 5, 2015, which claims benefit of European Application No. 14154178.9, filed Feb. 6, 2014.

The invention relates to a method for operating a linearly concentrating solar power plant, in which a heat transfer medium flows through a pipeline loop having at least one receiver, the heat transfer medium having a flow velocity which is such that no inadmissible temperature differences occur within the pipeline loop. This is achieved, as a rule, in that the flow in the pipeline loop is turbulent. Furthermore, the invention relates to a linearly concentrating solar power plant with at least one pipeline loop having at least one receiver in which a heat transfer medium flowing through the pipeline loop is heated by the irradiation of energy.

Linearly concentrating solar power plants are, for example, parabolic trough solar power plants or Fresnel solar power plants. These conventionally comprise a multiplicity of pipeline loops through which a heat transfer medium flows. The pipeline loops are equipped with receivers in which the radiant energy of the sun is focused by means of parabolic mirrors in the case of parabolic trough solar power plants or Fresnel mirrors in the case of Fresnel solar power plants and is directed onto the pipeline so that the heat transfer medium inside the pipelines is heated by the solar energy.

Heat transfer media which are employed preferably have a high boiling temperature and a low vapor pressure so that the heat transfer medium does not evaporate in the receiver even at the temperatures occurring in a solar power plant. Suitable heat transfer media are, for example, salt melts, for example what is known as solar salt, which is a mixture of sodium nitrate and potassium nitrate in a ratio of 60:40. This is employed particularly in order to achieve higher operating temperatures and therefore higher efficiency in the linearly concentrating solar power plant.

In addition to the use of salt melts, at the present time biphenyl/diphenylether mixtures are also employed as heat transfer medium in solar power plants, but because of a decomposition temperature of approximately 400° C. their maximum operating temperature is limited. Since the efficiency of a solar power plant also falls with a fall in operating temperature, the aim is to employ heat transfer media which can be operated in a stable way even at temperatures of more than 400° C.

In contrast to a biphenyl/diphenylether mixture, when salt melts are used, there is, however, the disadvantage that these may, in general, solidify at temperatures above the ambient temperature. Thus, for example, a sodium/potassium nitrate mixture melts in the eutectic, that is to say at a mixture ratio of 44:56, at a temperature of 218° C. In long pipeline systems, such as occur in solar power plants, salt melts are therefore difficult to operate reliably when melting points are high. The freezing of the salt melt may cause serious damage in economic terms, since a salt expands greatly when it melts. As a result, fittings and pipelines may be forced open and seriously damaged.

The freezing of salt melts may, in principle, occur outside the operating times of the solar power plant, that is to say outside the radiation times of the sun or when solar radiation is absent because of weather conditions. Freezing results in volume contraction which can lead to a different state of solidification, depending on the pipeline system and operating state. It is expected that the solidifying melt converges into units, which are larger to a greater or lesser extent, in the lower region of the pipeline system, while spaces not filled with salt are formed in the upper regions of the system. During remelting, because there may be a long spatial distance between the melting locations with volume expansion and the spaces not filled with salt, sufficient volume compensation to reduce pressures which arise might not take place.

Since the sun does not shine continuously, it is necessary to operate the solar power plant in two different ways. On the one hand, during the day, energy is usually absorbed via the solar radiation, and, on the other hand, during the night or when there is deep shading caused, for example, by clouds, heat energy is radiated out of the hot solar array if solar irradiation is low. The technical arrangements of a solar power plant and its operation have to be designed for both types of operation and for a smooth transition between the two types of operation.

The absorption of solar heat radiation is exposed operationally to a fluctuating energy flow. In day time, solar radiation fluctuates from virtually zero in the morning and in the evening to the highest values at midday. Shading by clouds may also lead to a reduced radiation of solar heat. At the same time, it is necessary that the heat transfer medium is transferred into the heat storage system at approximately the design temperature of the hot storage tank. This is ensured at the present time in that the through flow of the heat transfer medium through the pipeline loops of the solar power plant is set such that a specification-compliant, that is to say sufficiently high, temperature is reached at the end of the pipeline loop.

The throttling of the through flow of the heat transfer liquid during day time operation when heat radiation is low is limited because minimum flow velocities in the pipeline loops of the solar array should not be undershot. To be precise, the flow must be turbulent so that the temperature of the pipeline through which the flow passes is kept sufficiently uniform. In the case of a very slow flow velocity and therefore a laminar flow, there is the possibility that layers of different temperature are formed in the pipeline system. If temperature differences in the pipeline are too great, inadmissible flexion may occur, which may cause damage to the receiver through which the flow passes.

For this reason, a minimum flow velocity which ensures a turbulent flow is required in the receiver.

Moreover, in night time operation, it is necessary either to empty the pipeline system or alternatively to pass a flow through it, in order to prevent the heat transfer medium from solidifying in the pipelines.

WO 2010/138606 A2 describes a solar power plant in which the flow velocity is set in order to obtain maximum electrical power. It describes as suitable heat transfer media, inter alia, water, ethylene glycol, water/alcohol mixtures, water/ethylene glycol mixtures and thermal oils. However, these have the abovementioned disadvantage that operation at very high temperatures is not possible. Furthermore, with these heat transfer media, the problem arising in the case of salt melts also does not arise, to be precise that, at low velocities, a layered flow may form which may lead to flexion of the pipeline.

A further linearly concentrated solar power plant is described in CN-A 101354191. This has sections which are operated at different temperatures. Here, too, water is used, the water already being evaporated in the solar array. On account of the use of water, even here, the efficiencies cannot be achieved which are possible in linearly concentrating solar power plants operating with heat transfer media which allow very much higher operating temperatures, for example salt melts.

US-A 2013/0199517 describes a tower power plant with vertically arranged receivers, in the case of which the heat transfer medium, after flowing through the receivers, can be recirculated via a bypass to a mixing unit upstream of the receivers, in order to be mixed in the mixing unit with supplied heat transfer medium and be routed once again through the receivers. Contrary to a linearly concentrating solar power plant in which the receivers are connected horizontally in series and are connected in series via long pipeline loops, the effective distance along which the heat transfer medium can be heated is very short in a tower power plant, and therefore high heating of the heat transfer medium is not possible here, in contrast to in a linearly concentrating solar power plant. The different set-up of the receivers therefore necessitates completely different requirements as to the periphery and the construction of the overall solar power plant. Moreover, in a tower power plant, the problem of freezing can be avoided relatively simply, since rapid emptying is possible because of the vertically running receiver pipes and the short pipeline distances.

The object of the present invention, therefore, is to provide a method for operating a linearly concentrating solar power plant, which allows reliable operation even at transitional times in the morning and the evening, and in which, moreover, it is ensured that the heat transfer medium does not freeze in the pipelines in night time operation.

This object is achieved by means of a method for operating a linearly concentrating solar power plant, in which a heat transfer medium flows through a pipeline loop having at least one receiver, the heat transfer medium having a flow velocity which is such that no inadmissible temperature differences occur within the pipeline loop, and at least part of the heat transfer medium, upon exit from the pipeline loop, being extracted and recirculated into the pipeline loop.

That no inadmissible temperature differences occur within the pipelines is achieved, for example, in that the flow in the pipeline loop is turbulent. The inadmissible temperature differences can also be avoided if the heat transfer medium can be heated uniformly from all sides, for example as a result of suitable placement of the mirrors.

By the extraction of at least part of the heat transfer medium upon exit from the pipeline loop and by this part being recirculated into the pipeline loop, it is ensured, even when heat radiation is low and heating of the heat transfer medium is consequently lower, that a sufficiently large quantity of heat transfer medium always flows through the pipeline system in order to ensure a turbulent flow. Layering of the heat transfer medium in the pipeline and therefore damage to the pipeline can thereby be avoided. Moreover, it possible in this way to obtain sufficiently high temperatures of the heat transfer medium. On the other hand, it is also possible to achieve a sufficient through flow in night time operation, in order to avoid the situation where the heat transfer medium solidifies in the pipelines, particularly when a salt melt is used, What can thereby be avoided, in particular, is the situation where too large a quantity is pumped around from the hot tank into the cold tank, since in each case only part of the heat transfer liquid is delivered or discharged and the rest is carried in the circuit. The quantity of heat transfer medium delivered or of heat transfer medium discharged must simply ensure that the temperature of the heat transfer medium in the pipelines remains so high that solidification does not occur.

The temperature at which solidification of the heat transfer medium reliably does not occur is also called the solidification control temperature of the solar array. This solidification control temperature lies above the solidification temperature of the heat transfer medium and is fixed on the basis of availability requirements and the insulation quality of the pipelines of the solar array. The solidification control temperature may in this case lie well below the design temperature of the tank having the cold heat transfer medium. If the heat transfer medium is introduced directly into the solar array fro the tank for the cold heat transfer medium, the solar array is not operated, at least in parts, at the low solidification control temperature, but instead at the higher design temperature of the tank having the cold heat transfer liquid. Since the heat losses of the solar array rise sharply with increasing temperatures, the result of this is that more heat is lost by radiation in the solar array than when the solar array is operated completely at the solidification control temperature. By virtue of the method according to the invention, on account of the circulation of the heat transfer medium in the pipeline loops, the temperature can be kept markedly closer to the solidification control temperature, so that the heat losses can thereby be minimized.

Since, due to the method according to the invention, the temperature in the pipeline loops of the solar array can be kept essentially constant both in day time operation and in night time operation, the pipeline systems are relieved of harmful alternating stresses.

In a preferred embodiment, that part of the heat transfer medium which is recirculated into the pipeline loop is mixed, before introduction into the pipeline loop, with the heat transfer medium delivered to the pipeline loop. The situation is thereby avoided where two streams of heat transfer media pass at different temperatures into the pipeline loop. Alternatively, it is, of course, also possible to introduce the recirculated heat transfer medium into the pipeline loop via a bypass, so that full mixing in the pipeline loop takes place on account of the turbulent flow. It is preferable, however, to use, for example, a mixer in which both the recirculated part of the heat transfer medium and newly delivered heat transfer medium are mixed. To mix that part of the heat transfer medium which is recirculated into the pipeline loop and the heat transfer medium delivered to the pipeline loop, for example, a tank may be used in which the recirculated part of the heat transfer medium and the delivered heat transfer medium are introduced and out of which a mixture of recirculated heat transfer medium and of delivered heat transfer medium is fed into the pipeline loop.

In one embodiment of the invention, the tank in which the recirculated part of the heat transfer medium and the heat transfer medium delivered to the pipeline loop are mixed is an emptying tank which is connected to a pipeline leading into the pipeline loop. The advantage of using the emptying tank is that additional plant components, for example mixing tanks, can be avoided.

In order, in the event of a power failure necessitating emptying of the solar array or even in the case of other events in which the solar array is to be emptied, to have available sufficient emptying volume into which the heat transfer medium can flow during emptying, it is preferable if, during the operation of the linearly concentrating solar power plant, the emptying tank is partly filled and the non-filled volume is dimensioned such that the heat transfer medium contained in the pipeline loop can flow out into the emptying tank. This is advantageous particularly when the emptying tank is used as a mixing tank in which the recirculated part of the heat transfer medium and the heat transfer medium delivered to the pipeline loop are mixed.

Alternatively to the use of the emptying tank for mixing the recirculated part of the heat transfer medium and the heat transfer medium delivered to the pipeline loop, it is also possible to use a central mixing tank, into which heat transfer medium to be delivered to a plurality of pipeline loops and the recirculated heat transfer medium from a plurality of pipeline loops are delivered and in which the recirculated heat transfer medium and the heat transfer medium to be delivered are fully mixed and out of which the pipeline loops are fed. This has the advantage, in particular, that the operating conditions of the pipeline loops which are fed from one mixing tank are identical, in particular that the heat transfer medium in the pipeline loops which are fed from the mixing tank has the same temperature and the same pressure. The use of a central mixing tank has the advantage, in particular, that fewer components are required, and therefore, in particular, flanged connections and seals which may in each case cause leaks can also be avoided.

Since, as described above, it is preferable to operate the heat transfer medium in night time operation at as low a temperature as possible, it is necessary, in the changeover to day time operation, to heat the heat transfer medium to a minimum operating temperature. In order to obtain as rapid a heating of the heat transfer medium as possible, for example, it is possible, during the changeover from night time operation to day time operation, to conduct the entire heat transfer medium extracted at the outlet of the pipeline loop back into the pipeline loop until the heat transfer medium has been heated to the minimum operating temperature. This avoids the situation where the temperature of the heat transfer medium delivered to the pipeline loop is lowered again as a result of the admixing of fresh heat transfer medium having a lower temperature. This allows more rapid heating of the heat transfer medium routed through the pipeline loops to the minimum operating temperature. As soon as the minimum operating temperature is reached, colder heat transfer medium can then be delivered again and can be heated. The heat transfer medium thus heated, which is then not extracted and recirculated, is introduced from the pipeline loop into a tank for hot heat transfer medium. In order to utilize the energy of the heat transfer medium, the heat transfer medium is then extracted from the tank for hot heat transfer medium, and, for example in a heat exchanger, heat can be transferred to a steam circuit in which water is first evaporated and the steam then superheated. The heat transfer medium is then introduced from the heat exchanger back into the tank for the cold heat transfer medium. The steam can be utilized, for example, in order to drive, via turbines, generators for current generation. The heat transfer medium from the tank for cold heat transfer medium is then conducted again through the pipeline loops in which it is heated by solar radiation as a result of the absorption of energy.

As soon as the heat radiation by the sun has decreased to an extent such that there has to be a changeover to night time operation, the heat transfer medium is circulated in the pipeline loop again until the solidification control temperature is reached. It is preferable that, in night time operation, the recirculated part of the heat transfer medium is then dimensioned such that the mixture, delivered to the pipeline loop, of recirculated heat transfer medium and of delivered heat transfer medium has a temperature which lies at most 20% of the temperature value in ° C. above the solidification temperature. A suitable value by which the temperature of the heat transfer medium lies above the solidification temperature is, for example, 30° C. As a result, on the one hand, the temperature of the heat transfer medium which is routed through the pipeline loops in night time operation is kept as low as possible and, on the other hand, the situation is avoided where the temperature within the pipeline loop falls to a temperature below the solidification temperature as a result of heat dissipation. This ensures that, even in night time operation, no heat transfer medium solidifies within the pipeline loops.

The minimum temperature which the heat transfer medium has in order to prevent freezing of the pipelines is in this case also dependent on the velocity at which the heat transfer medium is conducted through the pipelines and on the quality of insulation of the pipelines and the receivers. In this case, a higher velocity makes it possible to have a shorter distance from the solidification temperature.

Any suitable heat transfer medium can be employed as a heat transfer medium for a linearly concentrating solar power plant. It is especially preferable to employ a salt melt as heat transfer medium. Suitable salt melts are, for example, nitrate salts and nitrite salts of the alkali metals, for example potassium nitrate, sodium nitrate, potassium nitrite or sodium nitrite and mixtures of these salts. A salt conventionally employed as heat transfer medium is a mixture of potassium nitrate and sodium nitrate, for example what is known as solar salt, a mixture of 40% by weight of potassium nitrate and 60% by weight of sodium nitrate.

A linearly concentrating solar power plant suitable for carrying out the method according to the invention has at least one pipeline loop having at least one receiver, in which a heat transfer medium flowing through the pipeline loop is heated by irradiating solar energy. In addition, a mixing device is comprised, in which at least part of the heat transfer medium flowing through the pipeline loop is mixed with heat transfer medium to be delivered.

In a first embodiment, the mixing device is a tank which is connected to a pipeline leading into the pipeline loop. In order in the tank to mix the heat transfer medium which has already flowed through the pipeline loop and heat transfer medium newly flowing into the pipeline loop, both the heat transfer medium to be introduced into the pipeline loop and the recirculated heat transfer medium are routed into the mixing tank and mixed with one another there. Intermixing may in this case take place, for example, as a result of suitable introduction. Alternatively, it is also possible to provide any mixing means, for example an agitator, in the tank. The agitator may in this case assume any form known to a person skilled in the art. It is also possible to employ a static mixer.

Alternatively, it is also possible that the mixing device is a bypass leading from the outlet of the pipeline loop to the inlet of the pipeline loop. In this case, some of the heat transfer medium leaving the pipeline loop is introduced into the bypass and flows through this to the inlet of the pipeline loop where the bypass issues into the pipeline issuing into the pipeline loop, and the heat transfer medium is thus mixed from the bypass into the newly delivered heat transfer medium. Intermixing then takes place within the pipeline by virtue of the turbulent flow or by means of static mixers inserted into the pipeline.

In one embodiment of the invention, a pump is accommodated in the bypass. By means of the pump, the quantity of heat transfer medium which is to be recirculated and is to be mixed with the newly delivered heat transfer medium can be metered. Moreover, by means of the pump, the pressure drop occurring on account of the length of the pipeline loops can be overcome.

As an alternative to a mixing device which is assigned to each individual pipeline loop, it is also possible, if the solar power plant comprises a multiplicity of pipeline loops, to provide a central mixing device into which the heat transfer medium to be recirculated from the individual pipeline loops and the heat transfer medium to be delivered into the pipeline loops are introduced and out of which the mixture of recirculated heat transfer medium and of heat transfer medium to be delivered is fed into the pipeline loops. As already stated above, by means of the central mixing device, a multiplicity of flanges and connections can be dispensed with. Moreover, identical conditions are thereby provided, since the heat transfer medium is delivered at the same temperature to all the pipeline loops. Furthermore, it is also possible to combine a plurality of pipeline loops into one solar array segment and to combine the solar array segment with a central mixing device. In this case, a plurality of solar array segments are then combined into a solar array.

The central mixing device may be, for example, a part of a tank which is divided off by means of a dividing wall. The tank may in this case be any tank which is located in the linearly concentrating solar power plant, for example an emptying tank.

As in the case of the mixing devices which are assigned in each case to a pipeline loop, it is also possible in the case of the central mixing device to provide an additional mixing means, for example an agitator. Alternatively, here too, a static mixer may be employed.

Particularly when the mixing device provided is a tank which also serves at the same time as an emptying tank, it is necessary to provide the tank at the lowest point of the overall pipeline system, so that the heat transfer medium can flow into the emptying tank solely by virtue of the influence of gravity. For extraction, it is then advantageous to provide an immersion pipe, by means of which the heat transfer medium is extracted out of the tank or the separated-off part of the tank. The use of the immersion pipe can ensure that the entire heat transfer medium can be extracted out of the tank. The immersion pipe is in this case provided with a submersible pump, by means of which the heat transfer medium can be sucked out of the tank and fed into the pipeline loops. If the tank serves as emptying tank, the heat transfer medium can be introduced back into the pipeline system again via the immersion pipe even after an overall emptying of the pipeline system.

Figure 1:
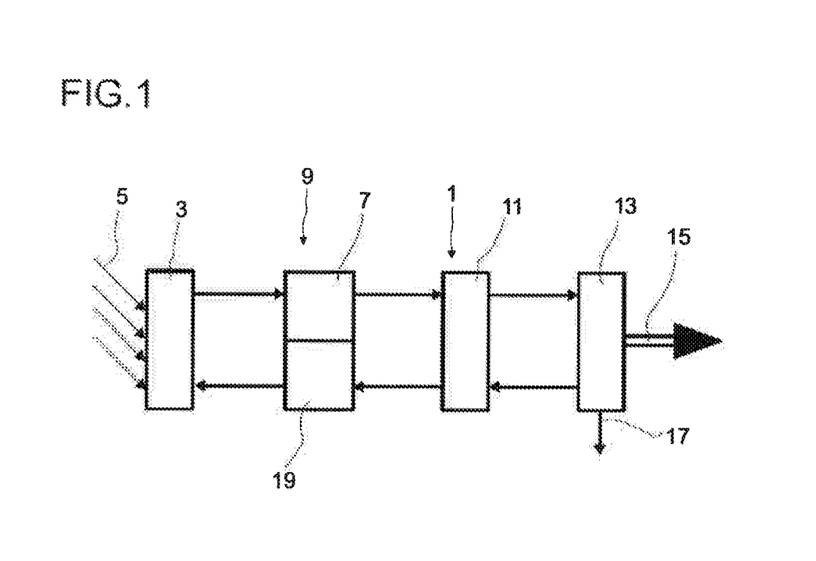
FIG. 1 shows a diagrammatic illustration of a linearly concentrating solar power plant.

A linearly concentrating solar power plant is illustrated diagrammatically in FIG. 1.

A linearly concentrating solar power plant 1 comprises a solar array 3 in which a heat transfer medium is heated by incident solar radiation 5. For this purpose, the solar array 3 usually comprises a plurality of series-connected receivers, through which the heat transfer medium is conducted. The receivers in each case comprise mirrors in which the incident solar radiation 5 is focused and deflected onto the heat transfer medium. The mirrors may in this case be designed, for example, in the form of parabolic troughs or else as Fresnel mirrors.

The heat transfer medium usually flows out of the solar array 3 first into a hot tank 7 of a heat storage system 9. The heat transfer medium flows out of the hot tank 7 into a heat exchanger 11 in which the heat transfer medium transfers heat to a water circuit. The water of the water circuit is thereby evaporated and superheated. The superheated steam drives a turbine 13 which drives a generator for the generation of electrical energy. Power generation in this case takes place in the same way as in a conventional power plant. The generation of electrical energy is in this case illustrated by an arrow 15.

By the turbine 13 being driven, the steam loses energy. This is dissipated in the form of heat 17. In this case, part of the steam may condense. The cooled steam flows back into the heat exchanger 11 in which it once again absorbs heat from the heat transfer medium and is evaporated and superheated. The steam condenser which is usually used in a power plant is not shown for simplification. The heat transfer medium thereby cooled flows into a cold tank 19 of the heat storage system. The heat transfer medium flows out of the cold tank 19 into the solar array 3 in which it is heated anew. The use of the heat storage system 9 with a hot tank 7 and a cold tank 19 has the advantage that such a large quantity of heat transfer medium can be heated and intermediately stored that heat can be transferred to the steam circuit for energy generation even at times when the sun is not shining and therefore no heating of the heat transfer medium can take place.

As illustrated diagrammatically in FIG. 1, the heat storage system 9 may in this case comprise a hot tank 7 and a cold tank 19. Alternatively, it is also possible to use as a heat storage system 9 a layered store in which the cold heat transfer medium is located in the lower region and the hot heat transfer medium is located in the upper region. In this case, the hot heat transfer medium is extracted out of the upper region and delivered to the steam circuit and the cold heat transfer medium is extracted out of the lower region and fed into the solar array 3.

Figure 2:
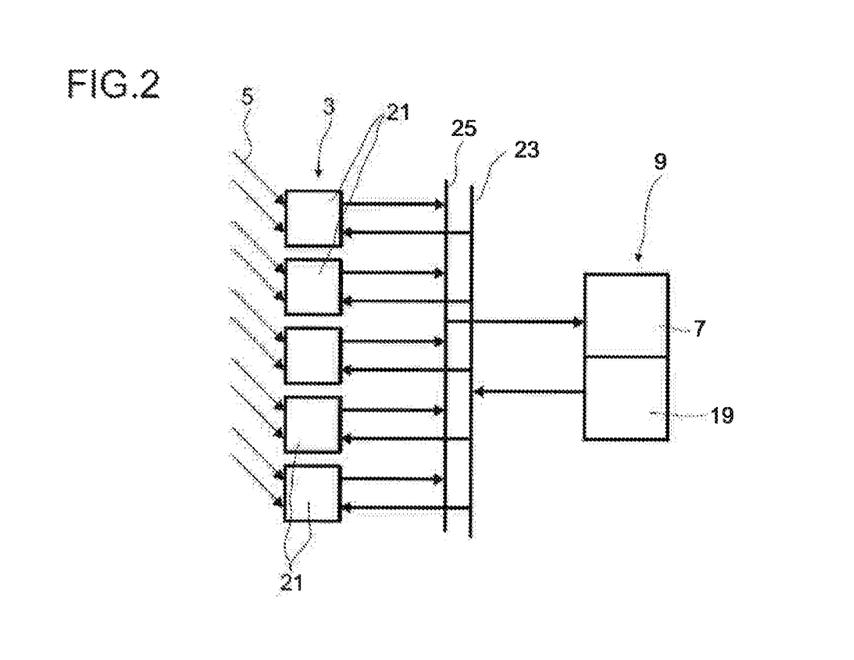
FIG. 2 shows a diagrammatic illustration of a segmented solar array which is coupled to a central store.

FIG. 2 illustrates diagrammatically a segmented solar array which is coupled to a central store.

FIG. 2 shows a detail of a linearly concentrating solar power plant 1 in which the solar array 3 is divided into individual solar array segments 21. In order to feed the individual solar array segments 21, the heat transfer medium is introduced from the cold tank 19 into a distributor 23. The heat transfer medium flows out of the distributor 23 into the individual solar array segments 21. Each individual solar array segment 21 in this case comprises one or more pipeline loops which are provided with receivers, by which the incident solar radiation 5 is captured and transferred, focused, to the heat transfer medium, in order thereby to heat the heat transfer medium. The heated heat transfer medium flows out of the individual solar array segments 21 into a collector 25. The collector 25 is connected to the hot tank 7 of the heat storage system 9, so that the heated heat transfer medium can flow out of the collector 25 into the hot tank 7.

Figure 3:
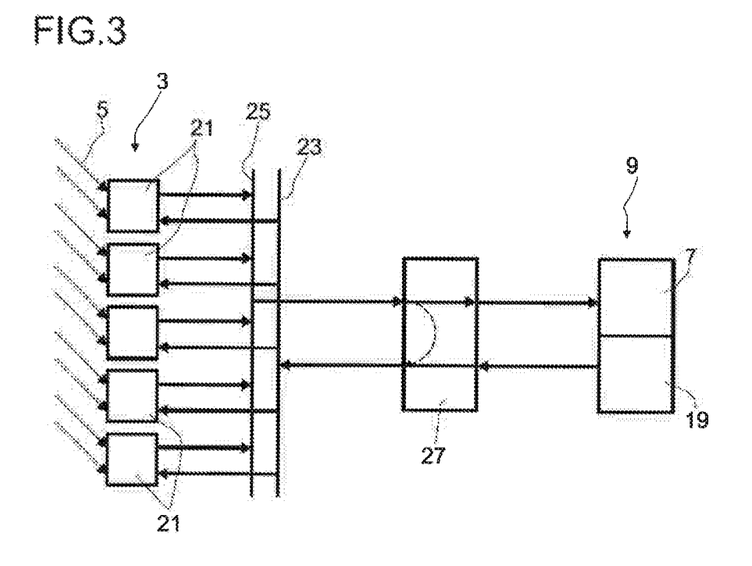
FIG. 3 shows a diagrammatic illustration of a segment solar array which is coupled to a central store with an interposed mixer.

FIG. 3 illustrates a segmented solar array which is coupled to a central store with an interposed mixer.

The set-up of the linearly concentrating solar power plant 1, as illustrated in FIG. 3, corresponds essentially to that illustrated in FIG. 2. In contrast to the embodiment illustrated in FIG. 2, the solar power plant illustrated in FIG. 3 has a mixing device 27 which is arranged between the heat storage system 9 and the distributor 23 or collector 25. The mixing device 27 affords the possibility of delivering part of the heat transfer medium from the collector 25 to the distributor 23 again, in order thereby to heat the heat transfer medium to a greater extent, for example during the starting of the linearly concentrating solar power plant when there is a changeover from night time operation to day time operation and the sun begins to shine again. In this case, part of the heat transfer medium is conducted back into the solar array 3 in order to heat this further. In this case, there is also the possibility of diverting the entire heat transfer medium out of the collector 25 in the mixing device 27 and of delivering it anew to the distributor 23. The heat transfer medium can thereby be heated to an extent such that a stipulated minimum temperature is reached. When the minimum temperature is reached, part of the heat transfer medium can be conducted into the hot tank 7 and, correspondingly, part can be extracted out of the cold tank 19 and delivered to the mixing device 27. In the mixing device 27, the cold heat transfer medium can be mixed with part of the heated heat transfer medium. The quantity of heat transfer medium which is conducted through the individual solar array segments 21 of the solar array 3 can thereby be kept so large that a turbulent flow can be implemented. As a result, layering of the heat transfer medium in the pipelines, which may cause damage to the pipelines, is avoided.

The mixing of already heated heat transfer medium into the cold heat transfer medium in the mixing device 27 is expedient particularly when the incident solar radiation 5 is not sufficient to heat the entire volume of heat transfer medium flowing through the solar array segments 21 to an extent such that it can be extracted completely and delivered to the hot tank 7.

Figure 4:
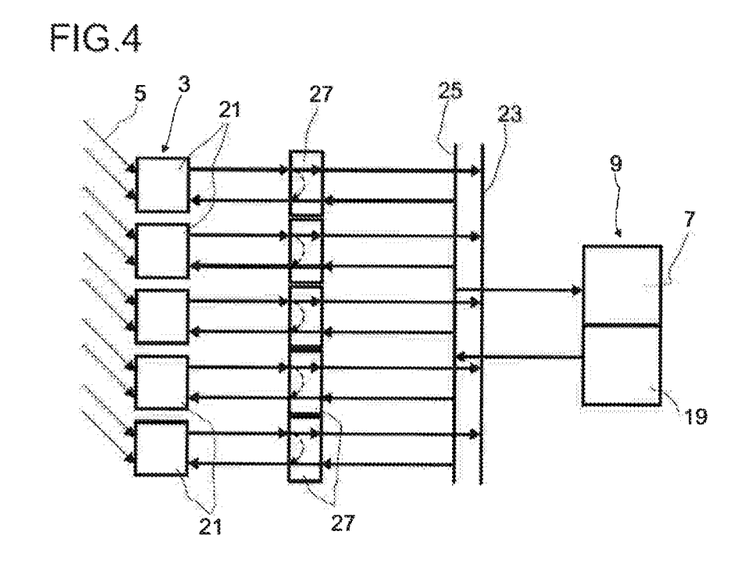
FIG. 4 shows a diagrammatic illustration of a segmented solar array which is coupled to a central store with interposed mixers.

An alternative arrangement of mixing devices is illustrated in FIG. 4. In contrast to the embodiment illustrated in FIG. 3, in the embodiment illustrated in FIG. 4 a mixing device 27 is assigned to each individual solar array segment 21. The mixing devices 27 are in this case located between the collector 25 or distributor 23 and the individual solar array segments 21. By mixing devices 27 being assigned to each individual solar array segment 21, there is the possibility of regulating the solar array segments 21 independently of one another, so that, in the case of different heat radiation or different heating of the heat transfer medium, the quantity of heated heat transfer medium which is delivered to the cold heat transfer medium in the mixing device 27 can in each case be set individually.

Furthermore, it is also possible to assign a separate mixing device 27 to each pipeline loop of a solar array segment 21.

Figure 5:
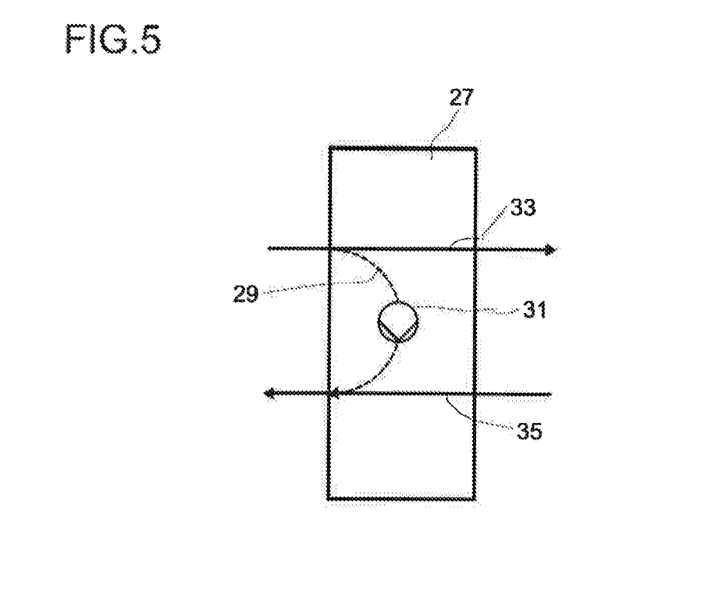
FIG. 5 shows a diagrammatic illustration of a mixing device with a pump.

An embodiment of a mixing device with a pump is illustrated diagrammatically in FIG. 5.

In the mixing device 27 illustrated in FIG. 5, full mixing is implemented by means of a bypass 29 through which heated heat transfer medium can be introduced from the pipeline leaving a solar array segment into a pipeline issuing into the solar array segment 21 and carrying the cold heat transfer medium. So that the quantity of heat transfer medium which is conducted through the bypass 29 can be set, in the embodiment illustrated in FIG. 5 a pump 31 is accommodated in the bypass 29. By means of the pump 31, the heat transfer medium can be transported out of the pipeline 33 carrying the hot heat transfer medium into the pipeline 35 carrying the cold heat transfer medium.

Particularly when the entire heat transfer medium is to be pumped around from the pipeline 33 carrying the hot heat transfer medium into the pipeline 35 carrying the cold heat transfer medium, for example during a changeover from night time operation to day time operation, conveyance of the heat transfer medium is implemented by means of the pump 31.

In addition to the bypass 29 illustrated in FIG. 5, the mixing device can also be implemented, for example, by means of a tank. This is illustrated by way of example in FIG. 6.

Figure 6:
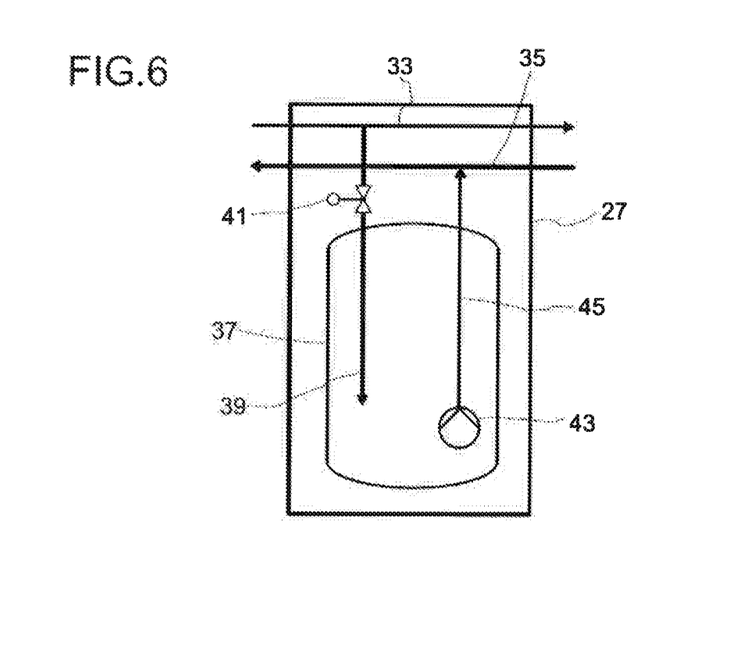
FIG. 6 shows a mixing device designed as a mixing tank with a submersible pump.

The embodiment of the mixing device 27 illustrated in FIG. 6 comprises a tank 37, into which issues a pipeline 39 branching off from the pipeline 33 carrying the hot heat transfer medium. The pipeline 39 accommodates a shut-off device 41, by means of which undershooting of a minimum filling level and overshooting of a maximum filling level in the tank 37 can be prevented. Thus, for example, it is necessary to open the shut-off device 41 when the filling level in the tank approaches the minimum filling level, and, on the other hand, the shut-off device 41 can be closed when the maximum filling level is reached, in order to avoid the situation where further heat transfer medium can flow in to the tank 37.

In the embodiment illustrated in FIG. 6, the heat transfer medium is extracted from the tank 37 with the aid of a submersible pump 43. The submersible pump 43 is in this case connected to a pipeline 45 which issues in the pipeline 35 carrying the cold heat transfer medium. In order to avoid the situation where the submersible pump 43 runs dry, the tank 37 must always contain a minimum filling quantity.

By the tank 37 being used, it is possible to avoid the occurrence of pressure losses during flow through a mixing device, as is illustrated, for example, in FIG. 5. The corresponding pressure losses additionally give rise to appreciable energy losses which are undesirable.

The tank 37, as illustrated in FIG. 6, may additionally also serve, in addition to its function as a mixing device, as an emptying tank into which the heat transfer medium flows when it is necessary, for example, to empty an individual solar array segment 21 to which the mixing device 27 is assigned. If a central mixing device 27 is provided, it would likewise be possible to utilize the tank 37 as an emptying tank, but in this case the latter has to be designed to be so large that the heat transfer medium from all the solar array segments 21 has room in the tank 37. The use of the mixing device 27 in the form of a tank 37 as an emptying tank is therefore preferable when a separate mixing device 27 is assigned to each solar array segment 21.

Figure 7:
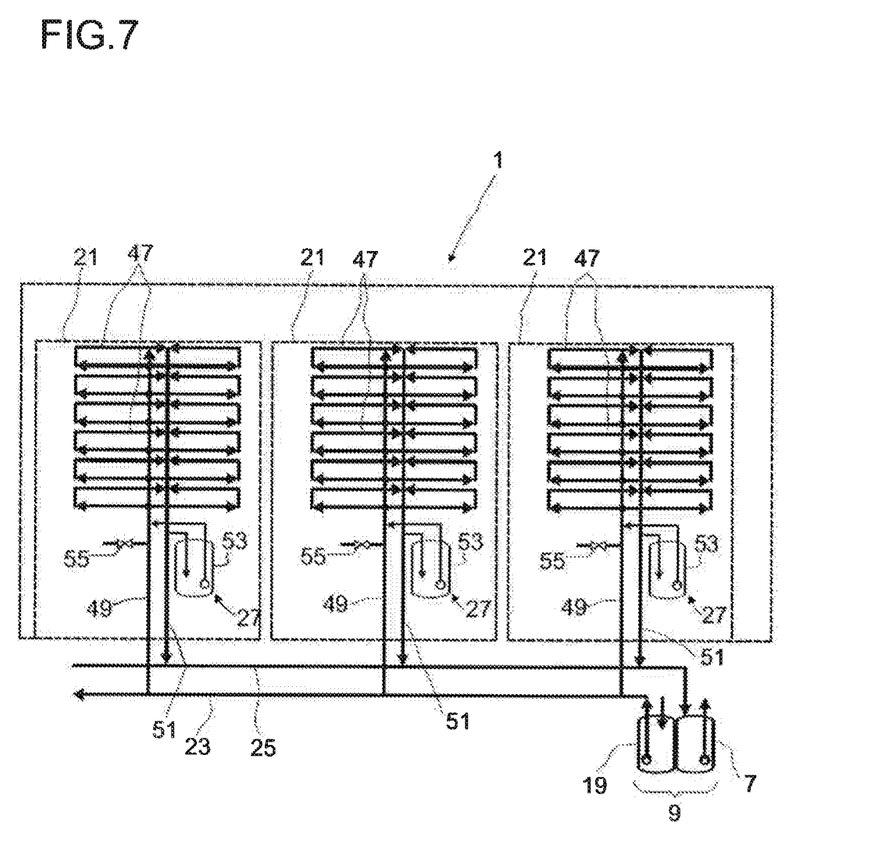
FIG. 7 shows a diagrammatic illustration of a linearly concentrating solar power plant with emptying segments, emptying tanks and mixers being assigned in each case to the segments.

A linearly concentrating solar power plant with a plurality of solar array segments, to which an emptying tank is assigned in each case, is illustrated in FIG. 7.

The linearly concentrating solar power plant 1 illustrated in FIG. 7 comprises a plurality of solar array segments 21 which in each case have a plurality of pipeline loops 47. In the individual pipeline loops 47 are arranged the receivers in which the heat transfer medium is heated by the incident solar radiation. The pipeline loops 47 are connected in each case to subdistributors 49 and subcollectors 51, the heat transfer medium being introduced into the pipeline loops 47 via the subdistributors 49, and the heat transfer medium which has flowed through the pipeline loops 47 flowing together in the subcollectors 51. The subdistributors 49 are in this case connected to the distributor 23 and the subcollectors 51 to the collector 25. The distributor 23 is in this case connected to the cold tank 19 and the collector 25 to the hot tank 7 of the heat storage system 9. In order to extract the cold heat transfer medium out of the cold tank 19, in the embodiment illustrated here a submersible pump is provided in the cold tank 19. Correspondingly, the heat transfer medium is also extracted from the hot tank 7 by means of a submersible pump, the hot heat transfer medium being delivered from the hot tank 7 to the heat exchanger 11.

In the embodiment illustrated in FIG. 7, each solar array segment 21 is assigned an emptying tank 53. The set-up of the emptying tanks 53 in this case corresponds to the set-up of the tanks 27 which is illustrated in FIG. 6. The emptying tanks 53 may therefore also be used at the same time as a mixing device 27.

When it is necessary to empty a solar array segment 21, a ventilation valve 55 is opened. The heat transfer medium then flows via the subdistributor 49 through the pipeline loops 47 into the subcollector 51 and out of the subcollector 51 into the emptying tank 53. So that the heat transfer medium flows into the emptying tank 53 even in the event of a power failure, the subdistributors 49, subcollectors 51 and pipeline loops 47 have in each case a gradient, the gradient being oriented such that the emptying tank 53 lies at the lowest point. By the ventilation valve 55 being opened, pressure compensation takes place, so that the heat transfer medium can flow into the emptying tank 53.

In order to assist emptying, it is possible, furthermore, to apply a vacuum to the emptying tank 53, so that the heat transfer medium is sucked into the emptying tank 53. However, this is not possible when the emptying tank 53 also serves at the same time as a mixing device 27. In this case, however, there is the possibility of applying excess pressure at the ventilation valve 55 in order to press the heat transfer medium out of the subdistributor 49, pipeline loops 47 and subcollector 51 into the emptying tank 53. Particularly when the heat transfer medium can, for example, react chemically with the oxygen from the air, it is preferable to employ an inert gas, for example nitrogen, for ventilation. In this case, the ventilation valve 55 is connected to a gas stock in which the corresponding gas is stocked.

In order to fill the solar array segment 21 with the heat transfer medium again after emptying, the heat transfer medium is introduced with the aid of the submersible pump 43 from the emptying tank 53 into the subdistributor 49. The heat transfer medium then flows out of this again into the pipeline loops 47 and the subcollector 51 and from there into the collector 25.

LIST OF REFERENCE SYMBOLS

1 Linearly concentrating solar power plant
3 Solar array
5 Solar radiation
7 Hot tank
9 Heat storage system
11 Heat exchanger
13 Turbine
15 Electrical energy
17 Heat dissipation
19 Cold tank
21 Solar array segment
23 Distributor
25 Collector
27 Mixing device
29 Bypass
31 Pump
33 Pipeline carrying hot heat transfer medium
35 Pipeline carrying cold heat transfer medium
37 Tank
39 Pipeline
41 Shut-off device
43 Submersible pump
45 Pipeline
47 Pipeline loop
49 Subdistributor
51 Subcollector
53 Emptying tank
55 Ventilation valve

The invention claimed is:

1. A method for operating a linearly concentrating solar power plant, in which
   the linearly concentrating solar power plant is a parabolic trough solar power plant or a Fresnel power plant and
   a heat transfer medium flows through a pipeline loop having at least one receiver, the heat transfer medium having a flow velocity which is such that the flow in the pipeline loop is turbulent and/or the heat transfer medium being able to be heated uniformly from all sides so that no inadmissible temperature differences occur within the pipeline loop,
   wherein at least part of the heat transfer medium, upon exit from the pipeline loop, is extracted and is recirculated into the pipeline loop, wherein that part of the heat transfer medium which is recirculated into the pipeline loop is mixed, before introduction into the pipeline loop, with the heat transfer medium delivered to the pipeline loop, and
   wherein, to mix that part of the heat transfer medium which is recirculated into the pipeline loop and the heat transfer medium delivered to the pipeline loop, a tank is used as mixing device, into which the recirculated part of the heat transfer medium and the delivered heat transfer medium are introduced and out of which a mixture of recirculated heat transfer medium and of delivered heat transfer medium is fed into the pipeline loop and
   wherein the tank is also configured as an emptying tank, wherein during the operation of the linearly concentrating solar power plant, the tank is partly filled and the non-filled volume is dimensioned such that the heat transfer medium contained in the pipeline loop can flow out into the emptying tank.

2. The method according to claim 1, wherein the heat transfer medium is a salt melt.

3. The method according to claim 2, wherein the salt melt is a mixture of potassium nitrate and sodium nitrate.

4. The method according to claim 2, wherein the salt melt is a mixture of 40% by weight of potassium nitrate and 60% by weight of sodium nitrate.

5. The method according to claim 1, wherein the tank is a central tank into which the recirculated heat transfer medium and the heat transfer medium to be delivered to a plurality of pipeline loops are introduced and fully mixed and out of which the pipeline loops are fed.

6. The method according to claim 1, wherein, in night time operation, the recirculated part of the heat transfer medium is dimensioned such that the mixture, delivered to the pipeline loop, of recirculated heat transfer medium and of delivered heat transfer medium has a temperature which lies at most 20% of the temperature value in ° C. above the solidification temperature.

7. The method according to claim 1, wherein the linearly concentrating power plant comprises a solar array in which a heat transfer medium is heated by incident solar radiation and said solar array comprises a plurality of series-connected receivers, through which the heat transfer medium is conducted.

8. A linearly concentrating solar power plant with at least one pipeline loop having at least one receiver in which a heat transfer medium flowing through the pipeline loop is heated by irradiating solar energy,
> the at least one pipeline loop configured to carry hot heat transfer medium from the at least one receiver and cold heat transfer medium to the at least one receiver,
> wherein a tank is connected to the pipeline loop and the tank is configured as a mixing device,
> wherein at least part of the hot heat transfer medium, upon exit from the pipeline loop, is extracted and is recirculated into the pipeline loop, wherein that part of the heat transfer medium which is recirculated into the pipeline loop is mixed in the tank, before introduction into the pipeline loop, with cold heat transfer medium delivered to the pipeline loop, wherein the tank which is also configured as an emptying tank, the tank volume being sized such that, in addition to being used for mixing, the total volume of heat transfer medium contained in the pipeline loop can flow out into the emptying tank.

9. The linearly concentrating solar power plant according to claim 8, wherein the solar power plant comprises a multiplicity of pipeline loops, and the tank is provided as a central tank, into which the heat transfer medium to be recirculated from the pipeline loops and the heat transfer medium to be delivered into the pipeline loops are introduced and out of which the mixture of recirculated heat transfer medium and of heat transfer medium to be delivered is fed into the pipeline loops and the linearly concentrating solar power plant is a parabolic trough solar power plant or a Fresnel power plant.

10. The linearly concentrating solar power plant according to claim 8, wherein the heat transfer medium is extracted out of the tank by means of an immersion pipe.

11. The linearly concentrating solar power plant according to claim 8, wherein the linearly concentrating power plant comprises a solar array in which a heat transfer medium is heated by incident solar radiation and said solar array comprises a plurality of series-connected receivers, through which the heat transfer medium is conducted.

\* \* \* \* \*